P. Verplanck Jr.
Dash Board and Rein-Holder.
Nº 76,007. Patented Mar 24. 1868.
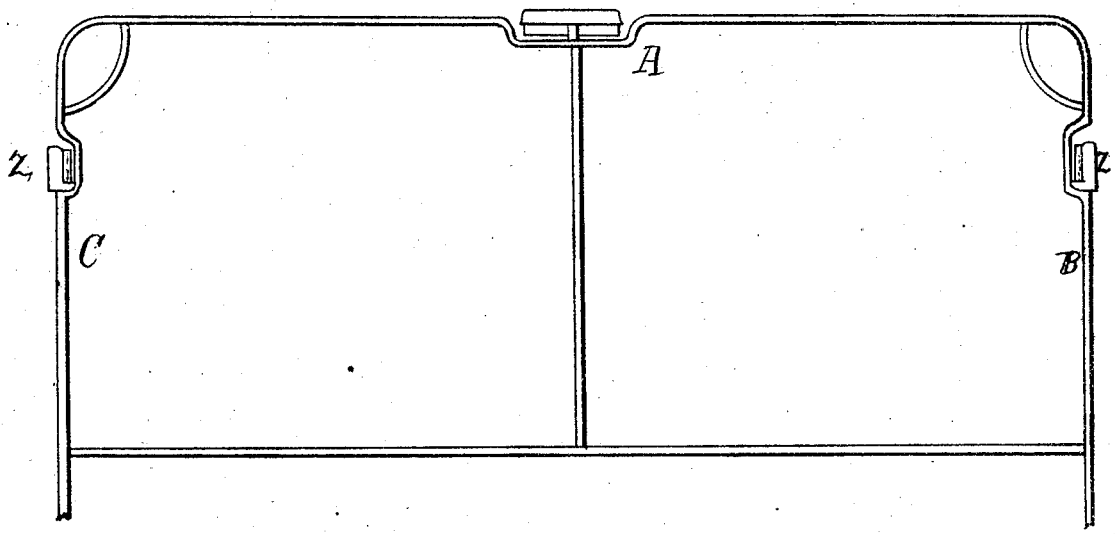
W. M. Gooding } Witness
Philip Verplanck Jun.
Inventor

United States Patent Office.

PHILIP VERPLANCK, JR., OF BINGHAMTON, NEW YORK.

Letters Patent No. 76,007, dated March 24, 1868.

IMPROVEMENT IN DASH-BOARD AND REIN-HOLDER.

*The Schedule referred to in these Letters Patent and making part of the same.*

TO ALL WHOM IT MAY CONCERN:

Be it known that I, PHILIP VERPLANCK, Jr., of Binghamton, in the State of New York, have made certain Improvements in Dash-Boards of carriages; and I hereby declare the following to be a full and exact description of the same, reference being herein had to the accompanying drawings, which make part of this specification.

The improvement consists in so constructing the upper and side irons in the frame of a dash-board as to receive and render more practicably useful Olmsted's rein-holder, patented in June, 1865, and of which the undersigned is now sole proprieter.

An indentation is made in the top iron of a dash-board, as at A in the annexed drawing, the depth being such as to allow of inserting Olmsted's rein-holder that its top shall be so near the level of the iron as to be no obstruction to the passing of the reins back and forth thereon, and so that the ends of the indented or bended iron, while allowing the rein to be freely, at will, passed into the holder, will at the same time prevent the reins being switched out of the holder by the tail of the horse, or by any ordinary lateral accidental snatch. The bottom of the recess A is flattened to receive the holder. In the side irons B and C, provision is also made for a holder, z, which can be adapted to receive both lines. The holders are constructed right or left, to suit the indented side, and are attached to the frame of the dash-board by the part that now attaches them to the part intended to be screwed to the carriage.

*Claim.*

What I claim as my invention, and desire to secure by Letters Patent, is—

1. The combination of the rein-holder z with the dash-board irons A B C, as shown.

2. So forming the side and top irons of the dash-boards of carriages as to receive, in an indentation in those irons, the rein-holder, the top of which shall be but little above the line of the iron, the ends of the indentations being so shaped as to be a stop or guard to the rein preventing it from being snatched or switched out of the holder, as hereinabove set forth.

PHILIP VERPLANCK, JR.

Witnesses:
W. M. GOODING,
A. MARSH.